United States Patent
Korthauer et al.

(10) Patent No.: US 10,173,529 B2
(45) Date of Patent: Jan. 8, 2019

(54) DRIVER ASSISTANCE SYSTEM AND METHOD FOR ADAPTING THE ILLUMINATION OF CONTROL ELEMENTS IN MOTOR VEHICLES

(71) Applicant: Robert Bosch GmbH, Stuttgart (DE)

(72) Inventors: Andreas Korthauer, Stuttgart (DE); Dieter Hoetzer, Markgroeningen (DE); Richard Bozsik, Budapest (HU)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/281,215

(22) Filed: Sep. 30, 2016

(65) Prior Publication Data

US 2017/0096098 A1    Apr. 6, 2017

(30) Foreign Application Priority Data

Oct. 2, 2015   (DE) .......................... 102015219111

(51) Int. Cl.
| | |
|---|---|
| H05B 37/02 | (2006.01) |
| B60K 37/06 | (2006.01) |
| B60R 1/00 | (2006.01) |
| G06K 9/00 | (2006.01) |
| G06K 9/20 | (2006.01) |
| B60K 35/00 | (2006.01) |
| B60Q 3/18 | (2017.01) |
| B60Q 3/85 | (2017.01) |

(52) U.S. Cl.
CPC .............. *B60K 37/06* (2013.01); *B60K 35/00* (2013.01); *B60Q 3/18* (2017.02); *B60R 1/00* (2013.01); *G06K 9/00845* (2013.01); *G06K 9/2054* (2013.01); *B60K 2350/2013* (2013.01); *B60K 2350/2069* (2013.01); *B60Q 3/85* (2017.02); *B60R 2300/8006* (2013.01)

(58) Field of Classification Search
CPC ............ H05B 37/0227; H05B 33/0848; G01J 1/4204
USPC .......................................................... 315/77
See application file for complete search history.

(56) References Cited

U.S. PATENT DOCUMENTS

| | | | |
|---|---|---|---|
| 2003/0169213 A1* | 9/2003 | Spero | G02B 5/20 345/7 |
| 2009/0115846 A1* | 5/2009 | Ohue | B60R 11/04 348/148 |
| 2012/0143391 A1 | 6/2012 | Gee | |
| 2015/0175106 A1 | 6/2015 | Frommann et al. | |

(Continued)

FOREIGN PATENT DOCUMENTS

| | | |
|---|---|---|
| DE | 202008010641 U1 | 11/2008 |
| DE | 102012010757 A1 | 12/2012 |
| DE | 102013021644 A1 | 6/2015 |

(Continued)

*Primary Examiner* — Daniel D Chang
(74) *Attorney, Agent, or Firm* — Norton Rose Fulbright US LLP; Gerard Messina

(57) ABSTRACT

A method for controlling illumination of operational controls in a motor vehicle, using a passenger-compartment camera for photographing a driver, in which a visual perception capability of the driver is determined with the aid of the passenger-compartment camera, and in which the illumination of an operational control is adjusted as a function of the visual perception capability of the driver.

15 Claims, 2 Drawing Sheets

(56) References Cited

U.S. PATENT DOCUMENTS

2016/0152178 A1* 6/2016 Peterson .............. B60Q 3/0293
315/77

FOREIGN PATENT DOCUMENTS

| DE | 112013006200 T5 | 9/2015 |
|---|---|---|
| EP | 2 770 403 A1 | 8/2014 |

\* cited by examiner

DRIVER ASSISTANCE SYSTEM AND METHOD FOR ADAPTING THE ILLUMINATION OF CONTROL ELEMENTS IN MOTOR VEHICLES

RELATED APPLICATION INFORMATION

The present application claims priority to and the benefit of German patent application no. 10 2015 219 111.7, which was filed in Germany on Oct. 2, 2015, the disclosure of which is incorporated herein by reference.

FIELD OF THE INVENTION

The present invention relates to a method for controlling illumination of operational controls in a motor vehicle, using a passenger-compartment camera for photographing a driver, as well as a suitable control or regulating device and a driver assistance system.

BACKGROUND INFORMATION

In today's production vehicles, it is often already possible to manually adjust the illuminance of operational controls in a motor vehicle. The driver is thereby allowed to adjust the illuminance on the basis of his/her normal preference or the currently existing driving situations.

Furthermore, the Patent Application EP 1 654 133 is from the related art. This patent relates to an antiglare system for a vehicle. The antiglare system includes a device for the control of an antiglare arrangement. The device includes at least one image generator. The antiglare arrangement is controlled as a function of a first signal of the image generator. In so doing, the light intensity in the passenger compartment is taken into consideration.

The U.S. Patent Application 2012143391 A1 is from the field of automotive engineering relates to a procedure and a device for adjusting a human-machine interface, in doing which, specific factors, what are referred to as driving factors such as the emotional state of the driver, being taken into account. In this case, it is also mentioned that if the driver has fallen asleep, he is awakened, for example, by a change in the music selection or volume, a change in the passenger-compartment temperature or a change of the passenger-compartment lighting.

In addition, the Patent Application EP 2 770 403 A1 lies in the field of cellular phones. It discusses a product which includes an ambient-light sensor, and which adjusts a display illumination as a function of the ascertained ambient light. Additionally, it is checked whether the user is wearing a visual aid, e.g., regular corrective glasses, contact lenses, monocle, etc. In response to a recognized visual aid, the display is put into a visual-aid mode, in which the illuminance is adjusted.

SUMMARY OF THE INVENTION

The method according to the present invention advantageously makes it possible to adjust the illumination of an operational control in a vehicle in automated fashion and as needed, so as to optimize its recognizability for the driver.

According to the present invention, this is rendered possible by the features set forth in the description herein. Further developments of the invention are the subject matter of the further descriptions herein.

The method of the present invention for controlling illumination of operational controls in a motor vehicle, using a passenger-compartment camera for photographing a driver is characterized in that a visual perception capability of the driver is determined with the aid of the passenger-compartment camera and the illumination of an operational control is adjusted as a function of the visual perception capability of the driver.

By this is understood that the seeing capability of the driver is analyzed. That is, it is checked whether visibility for the driver is suitable or unfavorable to fulfill the driving task (as well as the further associated tasks). In this context, the perception capability also relates to the area surrounding the vehicle, e.g., to the recognition of vehicles ahead or traffic signs. What is meant in particular, however, is a capability to perceive information made available to the driver within the vehicle. Graphic representations and/or elements and/or characters are cited, for instance, which are displayed to the driver with the aid of the operational controls.

It thereby becomes clear that the term "visual perception capability of the driver" used does not relate to wakefulness or drowsiness, mindfulness or attentiveness of the driver. Rather, the assumption should be a driver in the normal state, who is able to completely perform the driving task. Moreover, it should be pointed out that the term "visual perception capability of the driver" also is not intended to describe a physical capacity for visual perception existing in the person of the driver, as it is possibly influenced by weak eyesight of the driver. Therefore, the driver is in a condition and situation—for instance, also using visual aids, e.g., contact lenses—so that he is fully able to perform his driving task. Rather, the visual perception capability may be adversely affected by external factors and conditions. Due to the presence of such factors, the capability of the driver to see may be limited compared to visibility which is not influenced, for instance. Blinding of the driver because of glare is named as one example.

The illumination of one or more operational controls is adjusted as a function of the findings of this analysis. Data is ascertained by use of the passenger-compartment camera for this purpose. This data is prepared and evaluated by a processing unit. Signals are transmitted to the illumination units of the operational controls to be adjusted based on the data ascertained. For example, a control device is suitable for this purpose.

The data with regard to the seeing capability is ascertained and analyzed in automated fashion. Likewise, a possible adjustment of the illumination is carried out in automated fashion. The illumination is adjusted expediently as needed. Optimal assistance for the driver may thereby be achieved. Naturally, several evaluation levels may be provided in the analysis of the seeing capability, and therefore, for instance, several adjustment levels may also be realized in varying the illumination.

In addition, the perception capability is ascertained with the aid of the passenger-compartment camera. In this way, not only is the illumination adjusted on the basis of ascertained ambient conditions, but rather the actual effect of these conditions on the driver may advantageously be taken into account. For example, it is true that a possible glare situation may also be determined by a light-sensitive ambient sensor. However, by using the passenger-compartment camera, an actual glare situation is able to be recognized. For instance, depending on the intensity of the glare, it may advantageously be determined whether the visual perception capability is actually being influenced, and taken into consideration.

Furthermore, by the use of a passenger-compartment camera, not only are ambient conditions considered, but also conditions and factors indirectly and/or directly affecting the driver in the passenger compartment. For example, in this case, it may be considered whether the driver is wearing sunglasses, thereby reducing perception capability.

In one embodiment, the method is characterized in that the perception capability is ascertained in the case of an active driver.

By this is understood that the ascertainment of perception capability is not aimed at the identification of sleepiness or lack of attention of a driver. Rather, the illumination of the operational controls is adjusted in the case of a driver who is awake and alert. Such a driver is called an active driver, since he is fully performing his driving task.

In a further embodiment, the method is characterized in that the perception capability is influenced by external factors.

By this is understood that the ascertainment of the perception capability is not aimed at a physical inability to perceive visually (e.g., poor eyesight) existing in the person of the driver. Rather, the intention is to take factors into account which influence the perception of the driver, but do not lie directly in the person of the driver. As already addressed, in general, the term "visual perception capability" does not relate to the physical constitution or psychological situation of the driver.

In one advantageous implementation, the method is characterized in that the illumination of the operational control is adjusted as a function of a viewing direction of the driver.

That is, the decision as to which operational control is more strongly illuminated may be made as a function of a detected viewing direction or head orientation of the driver. The viewing direction may be determined with the aid of the passenger-compartment camera. Suitable methods for this purpose are found in the related art. By this is understood that, through an analysis of the viewing direction, the operational controls to which the decreased perception capability relates are determined, and a limited adjustment of the illuminance is carried out expediently for individual operational controls. Thus, for example, only the operational controls at which the driver is currently looking are more strongly illuminated. As a result, because an increase in the illuminance of further operational controls at which the driver is not currently looking is avoided, a possible distraction of the driver may be prevented. Furthermore, it is also possible to reduce the switching cycles necessary for the illumination units of these operational controls being disregarded at the moment. Naturally, the adjustment of the illumination may be maintained for the entire operation of the operational control—even if the driver directs his eyes briefly at the road again. In this sense, the viewing direction merely determines which operational control is currently of relevance for the driver, and thus decides which operational control requires a change of illuminance. Therefore, a viewing direction of the driver is advantageously determined, and the illumination of the operational control is adjusted as a function of the ascertained viewing direction of the driver.

In one advantageous implementation, the method is characterized in that the illumination of the operational control is adjusted when it is determined that the visual perception capability of the driver is impaired compared to uninfluenced visibility.

By this is to be understood that the illumination is altered in response to a poor or limited seeing capability. That is to say, if the capability of the driver to perceive decreases in comparison to normal, i.e., suitable visibility, an automatic change is carried out. An increase in the illuminance within the meaning of the present invention proves to be especially advantageous in such a situation.

In one further embodiment, the method is characterized in that reduced perception capability is recognized when a glare situation of the driver is ascertained.

As already explained, the illumination of an operational control is adjusted advantageously in response to impaired visual perception capability. A glare situation represents a situation in which it is assumed that the capability to perceive visually is reduced. For example, a glare situation may be detected advantageously with the aid of the passenger-compartment camera. By observing the face of the driver, especially the eye area, it is possible to determine actual blinding of the driver due to glare. In this case, the lighting of the face is analyzed. For example, the presently existing illuminance may be ascertained, as well as a change in the illuminance over time and the movement pattern of the vehicle. The recognizability and readability of the operational controls or the information displayed via the operational controls may be reduced by the glare effect. Therefore, in such a situation, the illumination is advantageously adjusted accordingly, especially increased, in order to improve the readability of the information for the driver.

In one especially advantageous specific embodiment, the method is characterized in that reduced perception capability is recognized when the driver is wearing sunglasses.

By this, it is to be understood that it is assumed that visual perception capability is reduced if it is detected that the driver is wearing sunglasses. First of all, sunglasses are usually only put on if there is glare by the sun and therefore visibility is impaired. Furthermore, owing to a darkening, the wearing of sunglasses directly influences the ability to see. Therefore, the illuminance of the operational controls is adjusted if it is detected that the driver is wearing sunglasses. In this context, sunglasses are able to be distinguished clearly from corrective glasses in the evaluation, for example, by the tinting of the lenses as well as shadowing of the eyes of the driver protected by them.

In one possible specific embodiment, the method is characterized in that the illumination of the operational control is adjusted when it is recognized that the driver is wearing sunglasses and a glare situation is ascertained.

As already explained, detected sunglasses may already be indicative of a glare situation. However, possibilities also exist to determine an actual glare situation. In one advantageous embodiment, the illumination of the operational controls is only adjusted if there is both a glare for the driver and he is also wearing sunglasses.

In one possible further refinement, the method is characterized in that the glare situation is determined on the basis of
   a position of the sun visor and/or
   current weather conditions and/or
   current time and/or
   current temperature and/or
   present position of the sun and/or
   position data of the vehicle and/or
   orientation of the vehicle and/or direction of travel.

As already described above, an actual blinding of the driver by glare may be determined by analyzing the data of a passenger-compartment camera. Alternatively, the further factors listed may also be taken into account to determine a glare situation. In so doing, the factors indicated may be considered individually. Advantageously, however, a combination of several factors is analyzed. It is also possible to use the indicated factors for a validation of a driver's face illuminated with the aid of camera recording. Moreover, such factors may also be used as trigger for an observation of the driver's face regarding a possible glare.

In one advantageous implementation, the method is characterized in that in reaction to impaired perception capability of the driver
the intensity of the illumination is increased and/or
the color of the illumination is changed.

Improved recognizability and cognition of information by the driver may be achieved in various ways. In particular, an increase of brightness, that is, an increase in the lighting intensity may be employed expediently for that purpose. In addition, change of color, e.g., by the use of higher saturations or completely different colors is also advantageous. In addition, the readability of information may be optimized by the selection of contrast colors.

In one possible further refinement, the method is characterized in that the manner of the adjustment and/or the magnitude of the adjustment may be set by the driver.

The adjustment may be set by the driver. For example, such a setting may be implemented with the aid of the settings in the system control of the vehicle. In addition, operator control is possible using the on-board computer or classic control knobs.

In an alternative further refinement, the method is characterized in that an implementation of the adjustment may be activated and/or deactivated by the driver.

Advantageously, the driver is able to determine whether such an adjustment of the operational controls should or should not be carried out in response to an ascertained visual perception capability. Therefore, the driver is able to switch on and also switch off a utilization of the function.

In one possible implementation, the method is characterized in that the illumination of the operational controls is adjusted in respect to human-machine interfaces (HMI), particularly in respect to
knobs and/or
toggle actuators and/or
rotary actuators and/or
touch displays and/or
navigation system and/or
instrument cluster and/or
head-up display.

The adjustment of the illumination of operational controls on the basis of an impaired visual perception capability, for example, may apply advantageously to a multitude of operational controls. In particular, human-machine operational controls (interfaces) are understood here. Several of these are listed by way of example. However, the method may also be employed on further operational controls in a motor vehicle. In an alternative further refinement, the basic brightness in the vehicle interior may also be adjusted. The basic brightness in the vehicle interior acts especially as external illumination of the operational controls. In this case, existing lighting devices may be used. Advantageously, perception by the driver may also thereby be improved.

Moreover, a control or regulating device is provided for a motor vehicle, having a passenger-compartment camera for photographing a driver. According to the present invention, this is characterized in that the control or regulating device has an arrangement and is furnished in order, when used as intended, to carry out a method as in the descriptions herein (A1-A13).

By this is understood that a control device and/or another processing unit is provided for the motor vehicle, which is configured, that is, is equipped and/or has an arrangement to carry out or to support a method as described above.

In addition, a driver assistance system is provided for a motor vehicle, having a passenger-compartment camera for photographing a driver. According to the present invention, this is characterized in that the driver assistance system has an arrangement and is furnished in order, when used as intended, to carry out a method as described herein (A1-A13).

By this is understood that a driver assistance system is provided for the motor vehicle, which is configured, that is, is equipped and/or has an arrangement to carry out or to support a method as described above.

It should be pointed out that the features specified individually in the description may be combined with each other in any technically useful manner, and reveal further embodiments of the invention. Additional features and functionality of the present invention are derived from the description of exemplary embodiments with reference to the accompanying figures.

DETAILED DESCRIPTION

Figure 1:
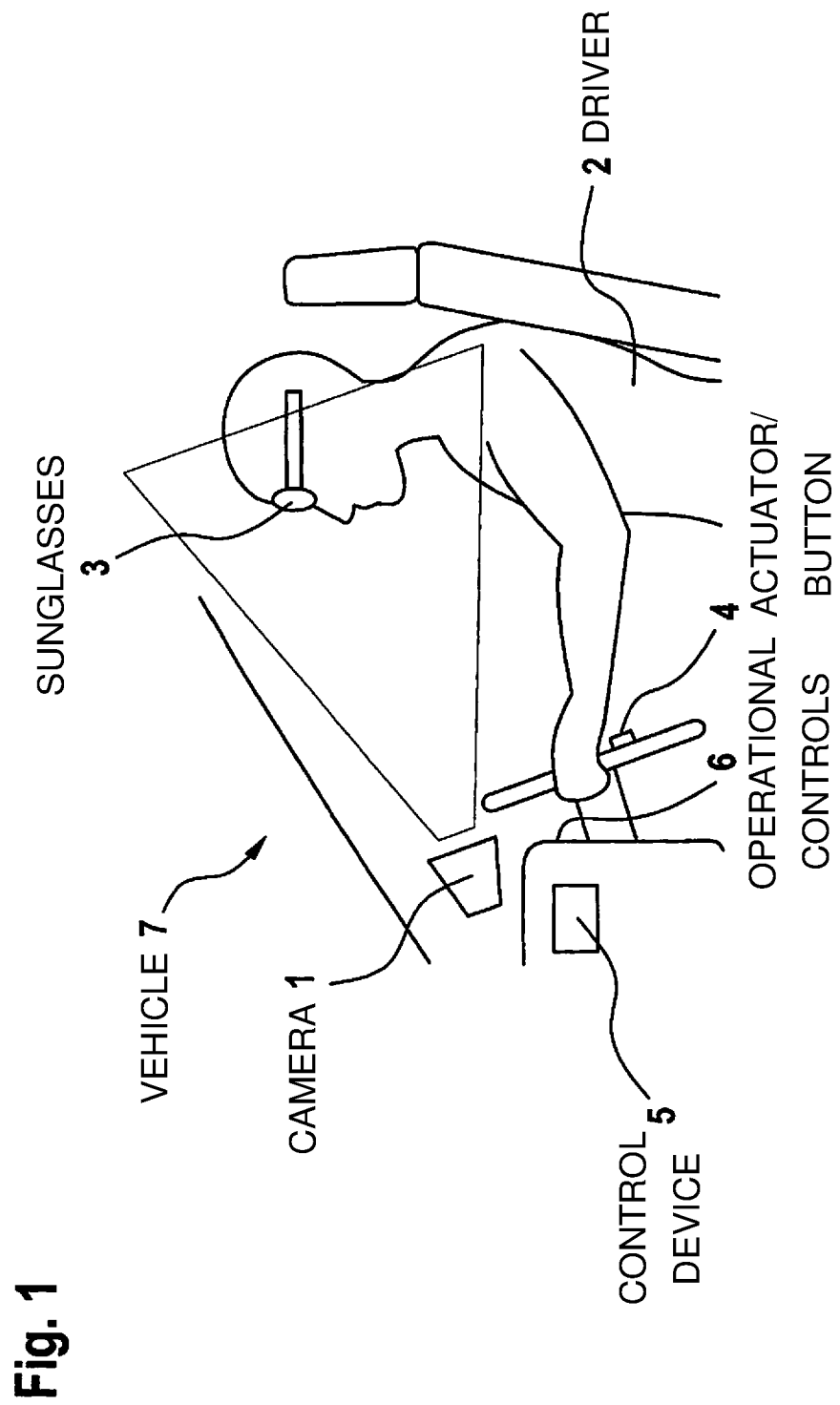
FIG. 1 shows a schematic representation of the check of the capability of the driver to perceive.

FIG. 1 shows a schematic representation of the check of the capability of driver 2 to perceive. In this case, driver 2 is photographed by a camera 1. The recorded data is evaluated in a computing unit. Such a computing unit is represented by control device 5, for example. In this case, it is checked whether driver 2 is wearing sunglasses 3, for instance. In response to a recognized reduced visual perception capability of driver 2, as exists owing to detected sunglasses 3, the illuminance of operational controls 6, for example, of the instrument cluster is adjusted. That is, the illuminance is increased. Driver 2 is able to deactivate or activate driver assistance system 4, e.g., by use of a push button. Alternatively, activation or deactivation is, of course, also possible via the settings in the menu of the vehicle control of vehicle 7.

Figure 2:
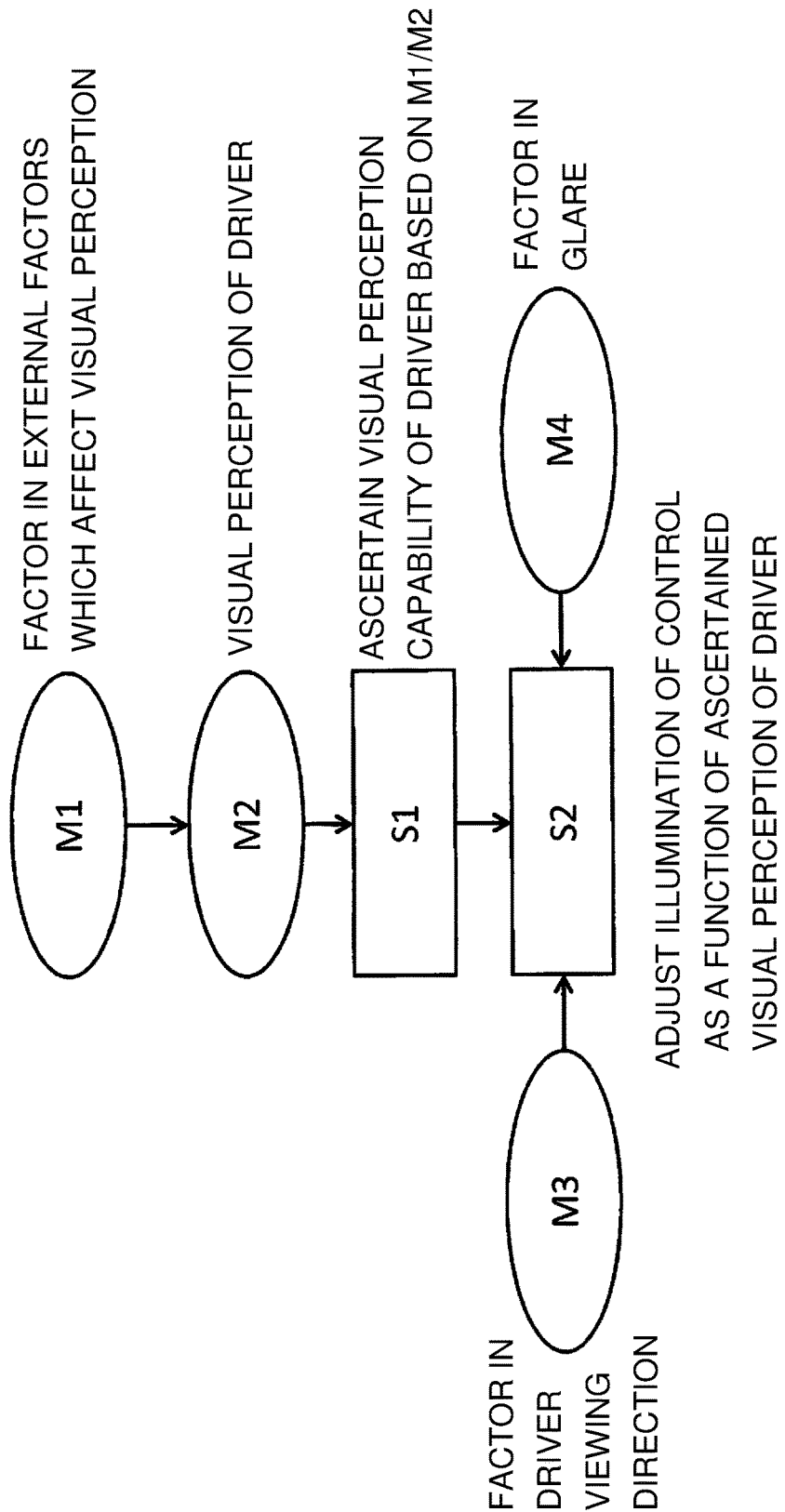
FIG. 2 shows a schematic representation of the method.

Additionally, FIG. 2 shows a schematic representation of the method. In a first method step S1, the visual perception capability is ascertained. In so doing, naturally feature M2, which describes the visual perception capability of the driver, is factored in. In addition, feature M1, which is represented by external factors that, for example, have an effect on the visual perception capability, is also taken into account. In a second method step S2, the illumination of an operational control is adjusted as a function of the ascertained visual perception capability of the driver. In so doing, feature M3 is considered, which describes the viewing direction of the driver. That is, the illumination of the operational control is also adjusted as a function of the viewing direction of the driver. In addition, feature M4 which describes a glare situation is taken into account.

What is claimed is:

1. A method for controlling an illumination of operational controls in a motor vehicle, using a passenger-compartment camera for imaging a driver, the method comprising:
determining a visual perception capability of the driver with the passenger-compartment camera; and adjusting the illumination of an operational control as a function of the visual perception capability of the driver; and determining whether a glare situation exists by using the passenger-compartment camera to image a face of the driver and at least one of: (i) analyzing a lighting of the face of the driver; and (ii) analyzing an image of the face of the driver to determine whether the image shows that the driver is wearing sunglasses;

wherein a reduced perception capability is recognized when the glare situation is determined, and wherein the glare situation is determined based on at least one of a position of the sun visor, a current temperature, a present position of the sun, an orientation of the vehicle, and a direction of travel.

2. The method of claim 1, wherein the perception capability is ascertained in the case of an active driver.

3. The method of claim 1, wherein the perception capability is influenced by external factors.

4. The method as of claim 1, wherein the illumination of the operational control is adjusted as a function of a viewing direction of the driver.

5. The method of claim 1, wherein the illumination of the operational control is adjusted when it is determined that the visual perception capability of the driver is impaired compared to uninfluenced visibility.

6. The method of claim 1, wherein the reduced perception capability is recognized when the driver is wearing sunglasses.

7. The method of claim 1, wherein the illumination of the operational control is adjusted when it is recognized that the driver is wearing sunglasses and a glare situation is ascertained.

8. The method of claim 1, wherein the glare situation is further determined based on at least one of a current time and position data of the vehicle.

9. The method of claim 1, wherein in reaction to impaired perception capability of the driver, at least one of the following is satisfied: (i) an intensity of the illumination is increased; and (ii) a color of the illumination is changed.

10. The method of claim 1, wherein the manner of at least one of the adjustment and a magnitude of the adjustment is settable by the driver.

11. The method of claim 1, wherein implementation of the adjustment is at least one of activatable and deactivatable by the driver.

12. The method of claim 1, wherein the illumination is adjusted in respect to human-machine operational controls or interfaces (HMI), in respect to at least one of knobs, toggle actuators, rotary actuators, touch displays, a navigation system, an instrument cluster, and a head-up display.

13. A control or regulating device for a motor vehicle, having a passenger-compartment camera for photographing a driver, comprising:
a determining arrangement to determine a visual perception capability of the driver with the passenger-compartment camera; and
an adjusting arrangement to adjust the illumination of an operational control as a function of the visual perception capability of the driver; and wherein the visual perception capability is at least determined by determining whether a glare situation exists by using the passenger-compartment camera to image a face of the driver and at least one of: (i) analyzing a lighting of the face of the driver; and (ii) analyzing an image of the face of the driver to determine whether the image shows that the driver is wearing sunglasses,
wherein a reduced visual perception capability is recognized when the glare situation is determined, and
wherein the glare situation is determined based on at least one of a position of the sun visor, a current temperature, a present position of the sun, orientation of the vehicle, and a direction of travel.

14. A driver assistance system for a motor vehicle, having a passenger-compartment camera for photographing a driver, comprising:
a control or regulating device for a motor vehicle, having a passenger-compartment camera for photographing a driver, including:
a determining arrangement to determine a visual perception capability of the driver with the passenger-compartment camera; and
an adjusting arrangement to adjust the illumination of an operational control as a function of the visual perception capability of the driver; and
wherein the visual perception capability is at least determined by determining whether a glare situation exists by using the passenger-compartment camera to image a face of the driver and at least one of (i) analyzing a lighting of the face of the driver; and (ii) analyzing an image of the face of the driver to determine whether the image shows that the driver is wearing sunglasses,
wherein a reduced visual perception capability is recognized when the glare situation is determined, and
wherein the glare situation is determined based on at least one of a position of the sun visor, a current temperature, a present position of the sun, orientation of the vehicle, and a direction of travel.

15. A method for controlling an illumination of operational controls in a motor vehicle, using a passenger-compartment camera for photographing a driver, the method comprising:
determining a visual perception capability of the driver with the passenger-compartment camera; and
adjusting the illumination of an operational control as a function of the visual perception capability of the driver;
wherein the illumination of the operational control is adjusted when it is recognized that the driver is wearing sunglasses and a glare situation is ascertained by using the passenger-compartment camera to image a face of the driver and at least one of (i) analyzing a lighting of the face of the driver, and (ii) analyzing an image of the face of the driver to determine that the image shows that the driver is wearing sunglasses.

* * * * *